United States Patent
Martinchek et al.

(10) Patent No.: US 9,634,340 B2
(45) Date of Patent: Apr. 25, 2017

(54) PLATE-STYLE WATER VAPOR TRANSFER UNIT WITH INTEGRAL HEADERS

(71) Applicant: GM Global Technology Operations LLC, Detroit, MI (US)

(72) Inventors: David A. Martinchek, Spencerport, NY (US); Ian R. Jermy, Leroy, NY (US); Jeffrey M. Guzda, Spencerport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1207 days.

(21) Appl. No.: 13/653,769

(22) Filed: Oct. 17, 2012

(65) Prior Publication Data
US 2014/0106244 A1    Apr. 17, 2014

(51) Int. Cl.
| | |
|---|---|
| H01M 8/04 | (2016.01) |
| H01M 8/04291 | (2016.01) |
| H01M 8/04119 | (2016.01) |
| H01M 8/1018 | (2016.01) |

(52) U.S. Cl.
CPC ... *H01M 8/04291* (2013.01); *H01M 8/04141* (2013.01); *H01M 8/04149* (2013.01); *H01M 2008/1095* (2013.01); *Y02E 60/50* (2013.01)

(58) Field of Classification Search
CPC .............. H01M 8/04; H01M 8/04291; H01M 8/04141; H01M 8/04149; H01M 2008/1095; Y02E 60/50
See application file for complete search history.

(56) References Cited

U.S. PATENT DOCUMENTS

| | | | |
|---|---|---|---|
| 6,471,195 B2 | 10/2002 | Shimanuki et al. | |
| 7,036,466 B2 | 5/2006 | Goebel et al. | |
| 7,156,379 B2 | 1/2007 | Tanihara et al. | |
| 7,459,227 B2 | 12/2008 | Rock et al. | |
| 7,572,531 B2 | 8/2009 | Forte | |
| 2009/0092863 A1 | 4/2009 | Skala | |
| 2010/0190076 A1* | 7/2010 | Fagley | H01M 8/04231 429/439 |
| 2012/0181712 A1* | 7/2012 | Vanderwees | H01M 8/04074 261/102 |

* cited by examiner

*Primary Examiner* — Miriam Stagg
*Assistant Examiner* — Seenam Agbetiafan
(74) *Attorney, Agent, or Firm* — Quinn IP Law (57) ABSTRACT

A water vapor transfer unit having fluid flow conduits which distribute wet or dry fluid throughout the water vapor transfer unit, which are created by forming apertures in each wet and dry plate so that when the plates are stacked, fluid flow inlet and outlet headers are integrated into the flow stack. These integrated headers negate the need for traditional wet and dry fluid inlet and outlet manifolds external to the water vapor transfer unit stack. Because the plates are stacked and sealed so that the fluid flows cannot co-mingle, the fluids are introduced directly into the stack, flow across the flow fields, and exit the stack without leakage or flow contamination. The integrated header design allows for sealing the stack on no more than a single plane defined by the stack or on no more than two parallel opposing planes and allows for accommodation of stack expansion and contraction.

8 Claims, 12 Drawing Sheets

PLATE-STYLE WATER VAPOR TRANSFER UNIT WITH INTEGRAL HEADERS

BACKGROUND OF THE INVENTION

The present invention relates generally to a way to improve the transfer of water vapor produced by a fuel cell, and more particularly to an improved sealing strategy for a water vapor transfer (WVT) unit.

Fuel cell systems produce electrical energy through the oxidation and reduction of a fuel and an oxidant. Hydrogen, for example, is a very appealing fuel source because it is clean and it can be used to produce electricity efficiently in a fuel cell. The automotive industry has expended significant resources in the development of hydrogen fuel cells as a source of power for vehicles. Vehicles powered by hydrogen fuel cells would be more efficient and would generate fewer emissions than today's vehicles employing internal combustion engines.

In a typical fuel cell system, hydrogen or a hydrogen-rich gas is supplied as a reactant through a flowpath to the anode side of a fuel cell while oxygen (such as in the form of atmospheric oxygen) is supplied as a reactant through a separate flowpath to the cathode side of the fuel cell. Catalysts, typically in the form of a noble metal such as platinum, are placed at the anode and cathode to facilitate the electrochemical conversion of the reactants into electrons and positively charged ions (for the hydrogen) and negatively charged ions (for the oxygen). In one well-known fuel cell form, the anode and cathode may be made from a layer of electrically-conductive gaseous diffusion media (GDM) with the catalysts deposited thereon to form a catalyst coated diffusion media (CCDM). An electrolyte layer (also called an ionomer layer) separates the anode from the cathode to allow the selective passage of ions from the anode to the cathode while simultaneously prohibiting the passage of the generated electrons; instead, the electrons are forced to flow through an external electrically-conductive circuit (such as a load) to perform useful work before recombining with the charged ions at the cathode. The combination of the positively and negatively charged ions at the cathode results in the production of non-polluting water as a by-product of the reaction. In another well-known fuel cell form, the anode and cathode may be formed directly on the electrolyte layer to form a layered structure known as a membrane electrode assembly (MEA).

The proton exchange membrane (PEM) fuel cell has shown particular promise for vehicular and related mobile applications. The electrolyte layer of a PEM fuel cell is a solid proton-transmissive membrane, such as a perfluorosulfonic acid membrane (PFSA) (a commercial example of which is Nafion™). Regardless of whether the above MEA-based approach or CCDM-based approach is employed, the presence of an anode separated from a cathode by an electrolyte layer forms a single PEM fuel cell; many such single cells can be combined to form a fuel cell stack, increasing the power output thereof. Multiple stacks can be coupled together to further increase power output.

Fuel cells, particularly PEM fuel cells, require balanced water levels to ensure proper operation. For example, it is important to avoid having too much water in the fuel cell, which can result in the flooding or related blockage of the reactant flowfield channels, thereby hampering cell operation. On the other hand, too little hydration limits the electrical conductivity of the membrane and can lead to premature cell failure. Exacerbating the difficulty in maintaining a balance in water level is that there are numerous conflicting reactions taking place in a fuel cell that are simultaneously increasing and decreasing local and global hydration levels.

One method of ensuring adequate levels of hydration throughout the fuel cell includes humidifying one or both of the reactants before they enter the fuel cell. For example, the water produced at the cathode can be used, with an appropriate humidification device, to reduce the likelihood of dehydration of the anode or the PFSA ionomer membrane. One example of such a humidification device is a water vapor transfer (WVT) unit (also referred to as a membrane humidifier) that extracts the moisture from a humid fuel cell flowpath or flow channel and places it into a flowpath used to convey a reactant low in humidity. This is generally accomplished by using a WVT membrane that is disposed between adjacent high humidity and low humidity fluids. The membrane allows water vapor to pass through it from the higher humidity fluid to the lower humidity fluid while inhibiting the undesirable direct passage of gases from the low humidity fluid (for example, cathode inlet gases) to the outlet containing high humidity fluid (for example, cathode outlet gases) without having first passed through the fuel cell. In one form of construction, this membrane may be attached to a GDM. The combination of the WVT membrane and the GDM may be referred to as a separator, a separator plate, or a membrane humidifier assembly. Numerous such separator plates may be stacked together such that alternating layers facilitate the interaction of the dry and humid fluids.

In one form, the stacked separator plates typically include a plurality of in-plane flow channels adapted to convey the cathode and anode fluids. The WVT unit may be a cross-flow WVT unit in which the flow channels of the adjacent plates are oriented perpendicular to each other. In another configuration, the WVT unit may define a counter-flow arrangement wherein the flow through the wet plate is in the opposite direction of the flow through the dry plate.

Traditionally, the WVT unit is housed in a generally cube-shaped unit attached externally to the fuel cell stack and having four manifolds which serve as the inlets and outlets for the respective wet and dry flowpaths. Typically, the WVT unit housing is incorporated into the fuel cell system within a fuel cell module such as a lower end unit (LEU). To prevent leaking of both wet and dry fluids, which decreases the efficiency and life of the fuel cell system, the manifolds are sealed on the face through which they connect to the stack within the WVT unit. The afore-mentioned cross-flow configuration requires sealing on each plane through which the inlet and outlet manifolds are connected to the WVT unit; generally, sealing takes places on at least three planes of the WVT unit with one of these planes being at an angle to the other two. Seals are used to seal all four fluid flow manifolds (wet inlet and outlet and dry inlet and outlet) to their mating components within the LEU.

Often elastomeric seals are used to seal both the wet and the dry flows. Elastomeric seals require compression to maintain a tight seal. Maintaining adequate compression is particularly difficult in a cross-flow design where sealing must take place in two or more orthogonal directions of the WVT unit due to the perpendicular orientation of the wet and dry streams as described above. This, in turn, makes it difficult to maintain a tight seal on more than two of the four sealing planes. Traditional sealing strategies do not allow for sealing on fewer than three planes with one of those planes being perpendicular to the other two.

Once sealed, the WVT unit must also be able to accommodate cell expansion and contraction based on changing hydration levels and temperature. As such, managing thermal and humidity related expansion and contraction (up to 5 mm total displacement) has been an issue with earlier WVT unit stacked plate designs. The movement can lead to breakdown of sealing interfaces causing the undesirable dry and wet flow leakages discussed above. Coil springs may be used to place end plates, disposed on either end of the WVT unit, under tension. The springs hold the plates together while still allowing for expansion and contraction of the core through the spring coils, but do so with additional weight and complexity.

SUMMARY OF THE INVENTION

In accordance with the instant disclosure, and in view of the above and other disadvantages of the prior art, a fuel cell system having a WVT unit with a simpler sealing strategy which improves management of expansion and contraction of the WVT unit is shown.

According to one aspect of the present invention, a WVT unit can be simplified to achieve an efficient transfer of water vapor between adjacent flow fields in order to provide humidification of the dry side flowpath. In one embodiment, the WVT unit has a stacked plate design with alternating wet flow and dry flow plates in a cross-flow configuration. Fluid flow conduits, which distribute the fluid throughout the WVT unit, are created by forming apertures in each plate so that when the plates are stacked, fluid flow inlet and outlet headers are integrated into the flow stack. These integrated headers negate the need for traditional wet and dry fluid inlet and outlet manifolds external to the WVT unit stack. Because the plates are stacked and sealed so that the fluid flows cannot co-mingle, due to the perpendicular orientation of the plates in the cross-flow configuration and sealing edge strips, the fluids are introduced directly into the stack, flow across the flow fields, and exit the stack without any leakage or flow contamination. The integrated header design allows for sealing the stack on no more than a single plane defined by the stack or on no more than two parallel opposing planes. This simpler sealing strategy allows for stack expansion and contraction, an important consideration during stack operation where temperature and humidity levels may change. Face seals on the sealing plate seal the fluid flow conduits and allow for management of expansion and contraction of the stack. The height of the face seals and number of seals in series dictates the amount of deflection available between the WVT unit stack and the housing to accommodate expansion and contraction.

According to another aspect of the present invention, a fuel cell system is disclosed. The system includes a fuel cell stack made up of numerous fuel cells each of which comprises an anode to accept a hydrogen-bearing fluid, a cathode to accept an oxygen-bearing fluid and a medium cooperative with the anode and the cathode to pass at least one catalytically-ionized reactant between them. The system additionally includes a WVT unit as shown and described.

According to another aspect of the present invention, a method for transferring water vapor within a fuel cell is disclosed. The method includes configuring a water vapor transfer unit to include a plurality of wet side plates and dry side plates wherein each of the wet side plates and the dry side plates include flow channels and apertures for exchanging moisture. The method further includes stacking the wet side plates and the dry side plates so that the flow channels and apertures form integrated fluid conduits for directing the flow of a wet side fluid and a dry side fluid through the WVT unit. A high humidity fluid is introduced into the wet side plate through the integrated wet side first fluid conduit and a low humidity fluid is introduced into the dry side plate through the integrated dry side first fluid conduit. Each of the integrated fluid conduits includes an inlet header and an outlet header in fluid communication via the plurality of flow channels. Water vapor is exchanged from the wet side fluid to the dry side fluid as the fluids flow across the plates through the flow channels. The method further includes sealing the stacked wet side and dry side plates using a plurality of sealing plates and sealing the inlet and outlet fluid headers using face seals which accommodate expansion and contraction of the stacked wet side and dry side plates.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner.

Figure 8:
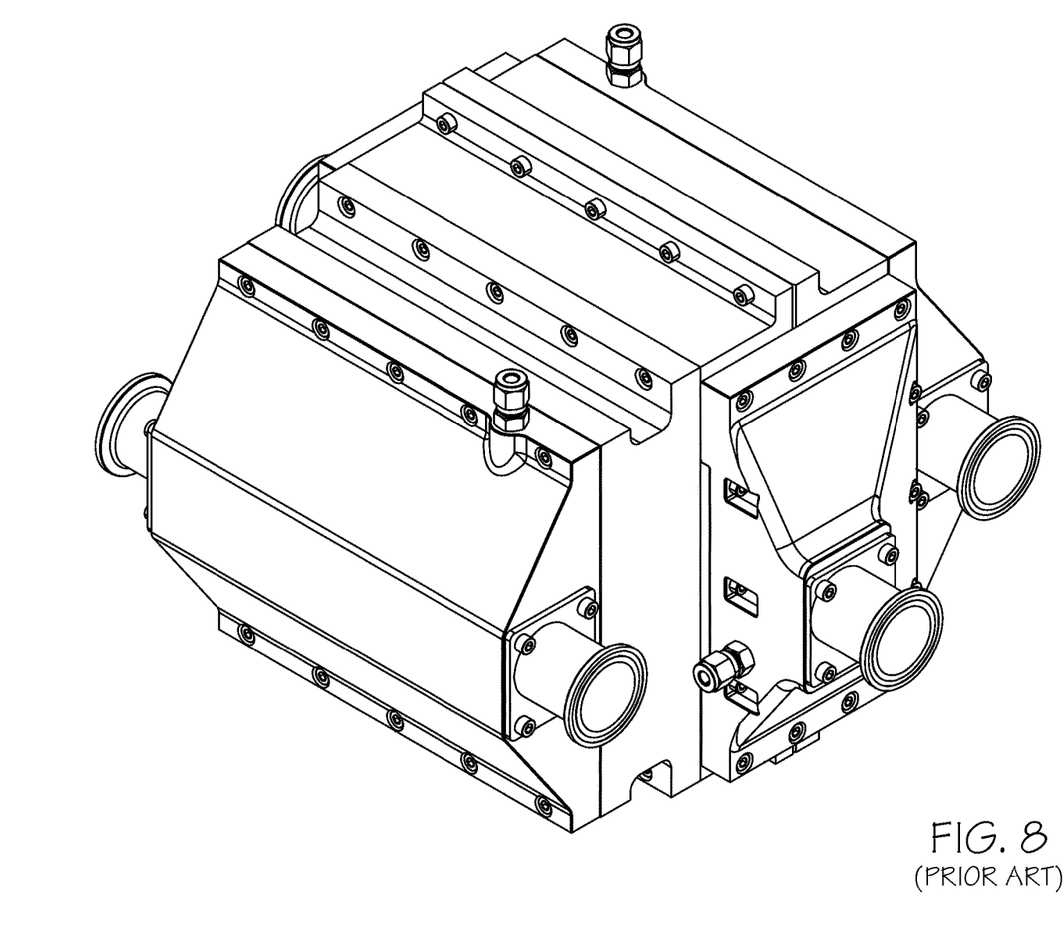
FIG. 8 is a perspective view of a prior art housing.

FIG. 8 shows a housing, typical in the art, for a water vapor transfer unit. Such a configuration is less desirable than the present configuration due to leaking of the wet and dry fluids because of inadequate sealing. The WVT unit requires sealing of wet inlet and outlet and dry inlet and outlet manifolds to their mating components within the LEU on each plane through which the inlet and outlet manifolds connect to the WVT unit. In a typical cross-flow configuration, sealing generally takes place on at least three planes of the WVT unit due to the perpendicular orientation of the manifolds. Generally, elastomeric seals, which require compression to maintain a tight seal, are used to seal both the wet and the dry flows. Maintaining adequate compression is particularly difficult in a cross-flow design where sealing must take place in two or more orthogonal directions of the WVT unit. This, in turn, makes it difficult to maintain a tight seal on more than two of the four sealing planes.

Figure 1A:
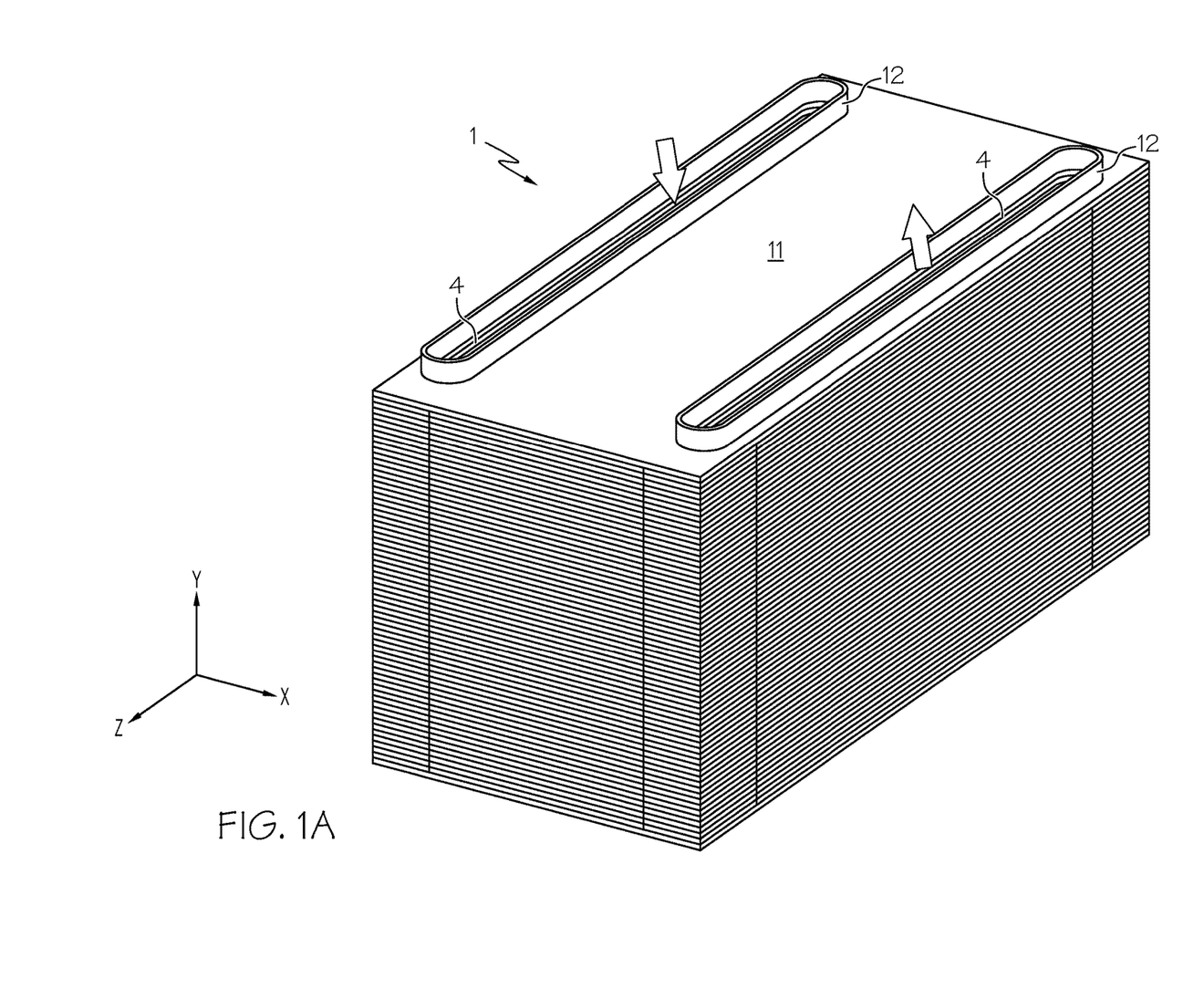
FIGS. 1a and 1b are perspective views of numerous stacked separator plates of a water vapor transfer unit according to one embodiment of the present invention, showing a water vapor transfer unit stack disposed between sealing plates having integrated fluid conduits sealed using face seals and having header inlet and outlets on two opposing planes.
Figure 1B:
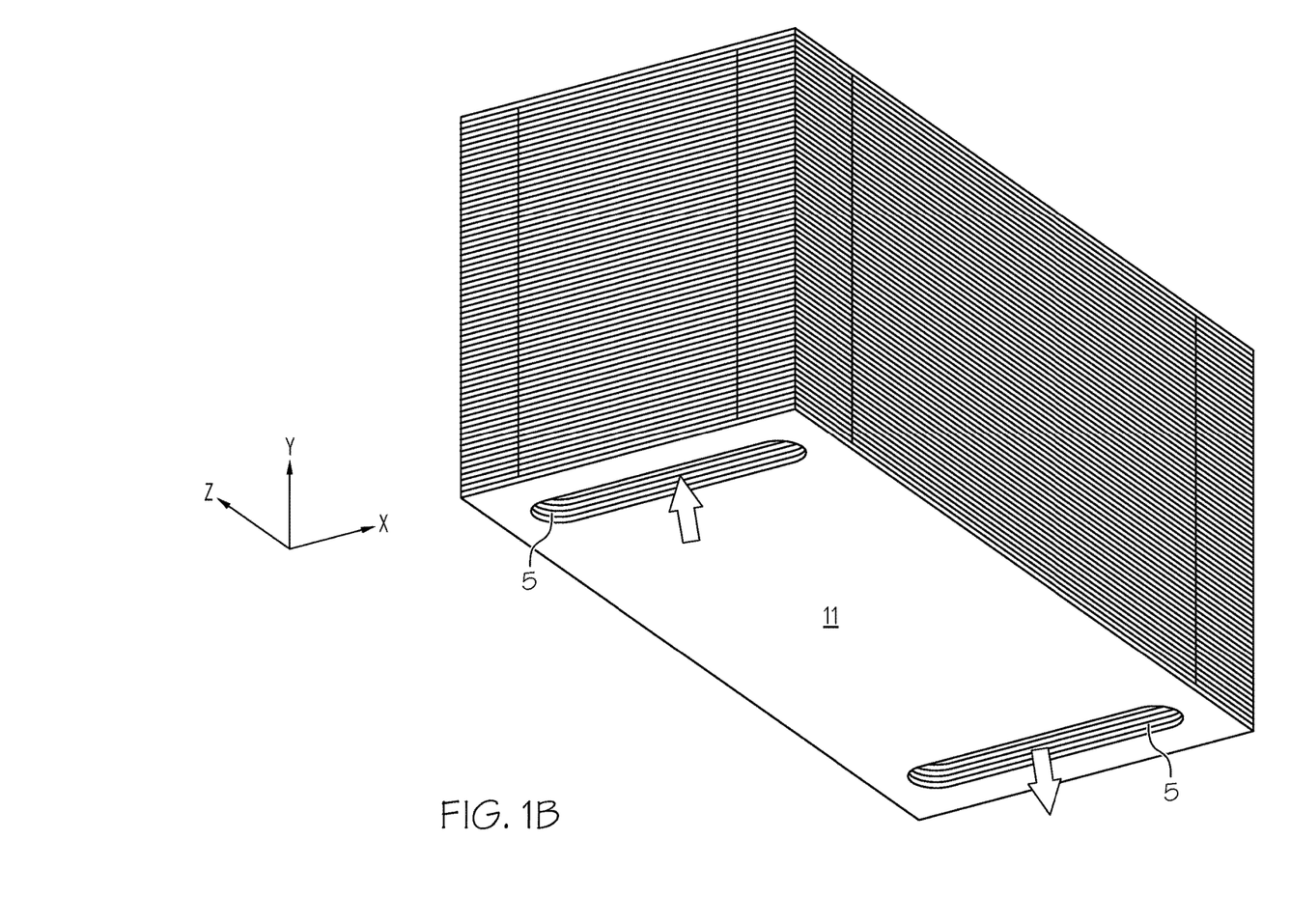
Figure 4A:
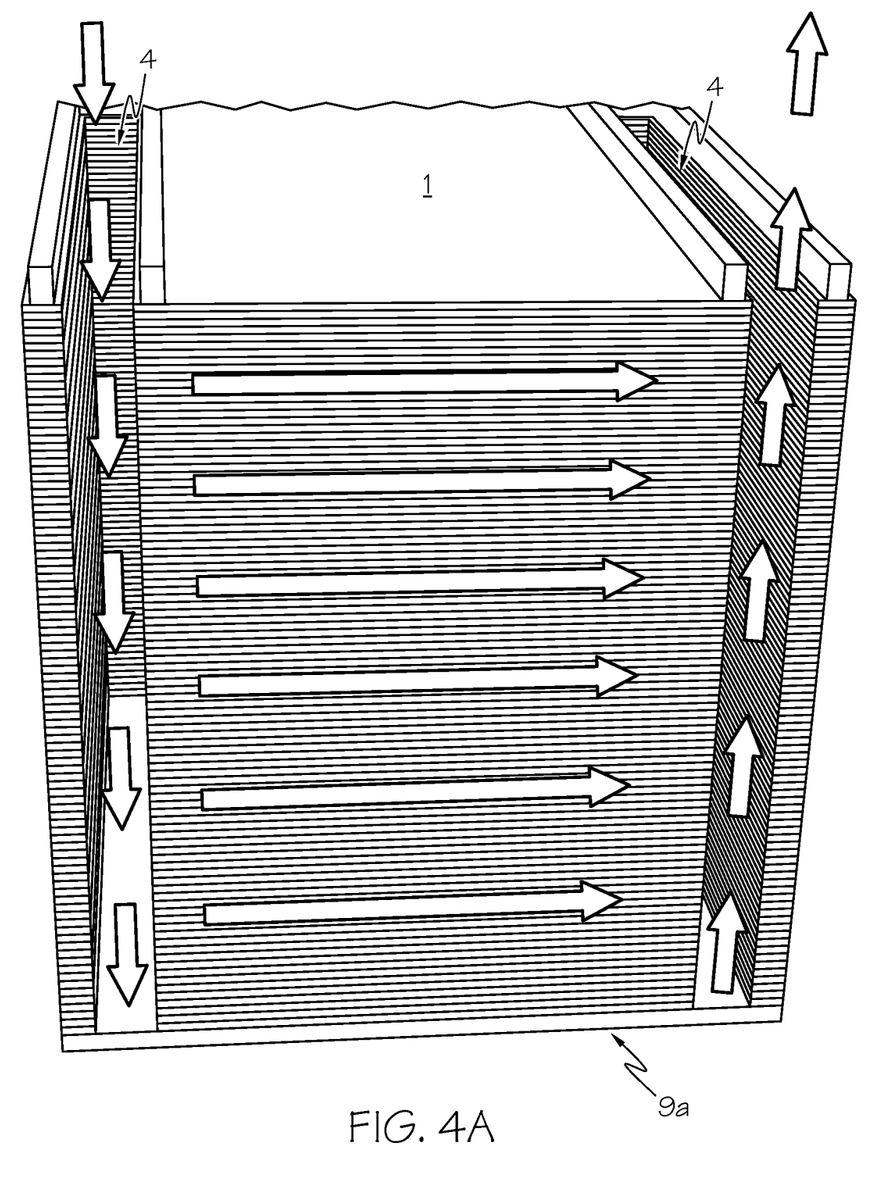
FIGS. 4a and 4b are cutaway perspectives and elevation views respectively of possible header shapes with arrows depicting fluid flow.

Referring to FIGS. 1a-2b, and 2d, a water vapor transfer unit 1 for a fuel cell system is shown; the water vapor transfer unit 1 is defined by a plurality of generally planar dry side plates 2 and a plurality of generally planar wet side plates 3 stacked relative to one another such that adjacent dry side 2 and wet side plates 3 are in humidity exchange communication with one another. The dry side plates 2 comprise a plurality of flow channels 6 formed within the plane of the plate which receive a dry fluid flow and the wet side plates 3 comprise a plurality of flow channels 7 formed within the plane of the plate which receive a wet fluid flow. Apertures 8 are formed in each of the dry side plates 2 and each of wet side plates 3 so that when stacked, dry fluid inlet and outlet headers 4 and wet fluid inlet and outlet headers 5 are formed for each of the dry fluid flow and wet fluid flow within the water vapor transfer unit 1. The inlet and outlet headers 4, 5 together form respective u-shaped fluid conduits 9a and 9b integrated into the water vapor transfer unit 1 whereby inlet and outlet fluids, in fluid communication with each other via the flow channels 6, 7, are introduced to and removed from the water vapor transfer unit 1. FIGS. 1a and 1b, in conjunction with FIG. 4a, illustrate one embodiment wherein each of the integrated fluid conduits 9a, 9b originate and terminate on a single, respective x-z plane situated at either the top or bottom of the stacked separator plates 2, 3 of the water vapor transfer unit 1; in another configuration the integrated fluid conduits 9a, 9b originate and terminate on both of the opposing x-z planes. The wet side plates 3 and the dry side plates 2 alternate in a stack and are separated by humidity exchange membranes (not shown) which permit the transfer of humidity from the wet stream to the dry stream across the membranes. As shown, the stacking dimension is along the y-axis orthogonal to the x-z planar dimension of each of the stacked separator plates 2, 3.

The water vapor transfer unit 1 is disposed between two plates on the xz plane coinciding with the origination and termination of the integrated fluid conduits 9a, 9b. At least one or both of the plates are sealing plates 11 which seal the top and bottom of the water vapor transfer unit 1 to prevent fluid flow leakage. The sealing plates 11 include face seals 12 which seal the integrated fluid conduits 9a, 9b. The water vapor transfer unit 1 and the face seals 12 are disposed within a housing 16. The housing 16 may be highly integrated within the fuel cell system or may be modular and discretely mounted separately from the fuel cell system. Deflection of the face seals 12 allows for expansion and contraction of the water vapor transfer unit by providing space between the stack and the housing 16. The amount of deflection is controlled by the height of the face seals 12 and the number of face seals 12 in series.

Figures 2A, 2D:
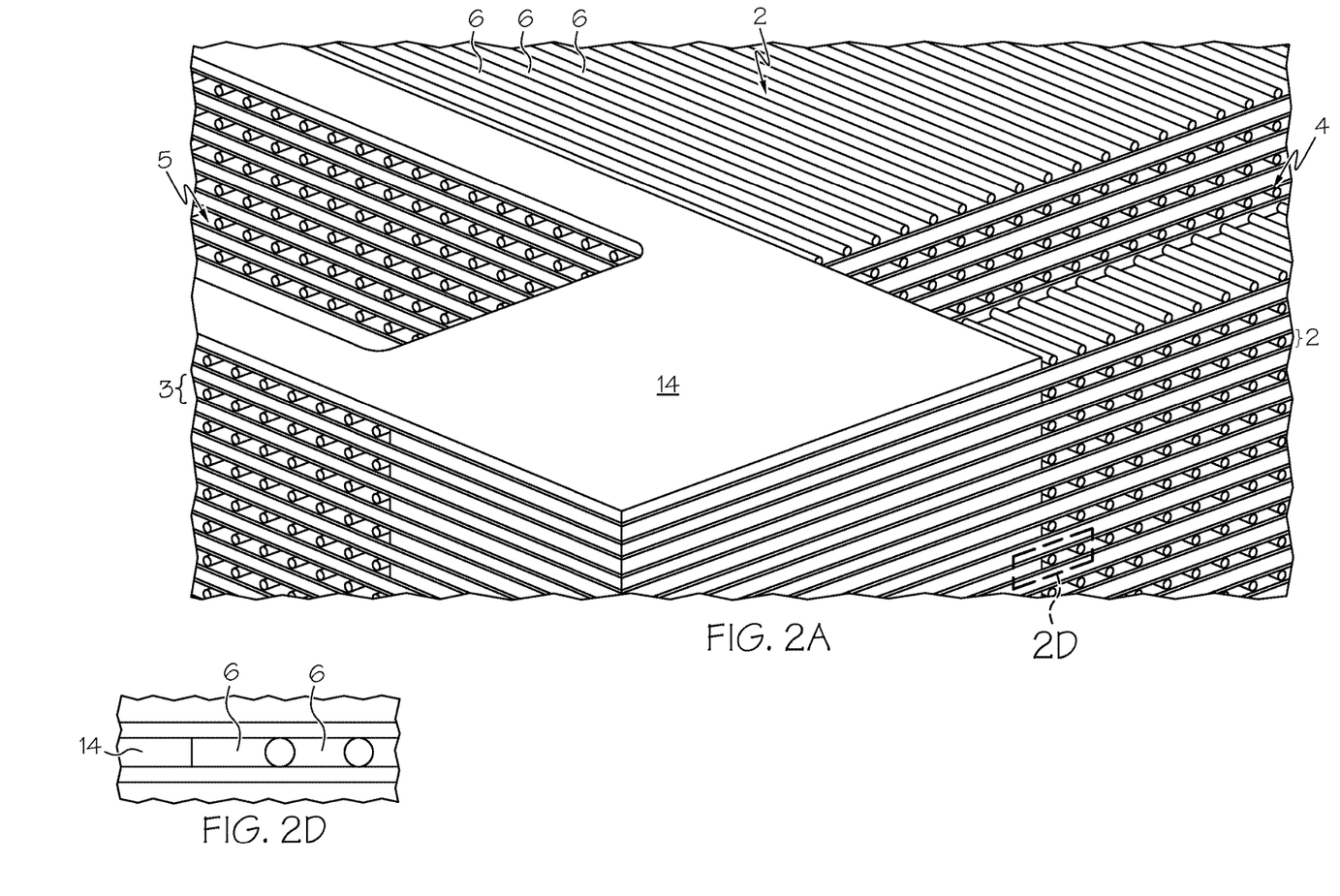
FIG. 2a is a detailed perspective view of the water vapor transfer unit of FIGS. 1a and 1b with the water vapor transfer or gas diffusion media removed, showing the details of the dry side separator plate, including the dry flow field, dry side and wet side headers, and an edge strip.
FIG. 2d is a detailed side view of a single plate, as depicted in FIG. 2a, in the water vapor transfer unit with the water vapor transfer or gas diffusion media and membrane material removed, showing the flow channels and an edge strip.
Figure 2B:
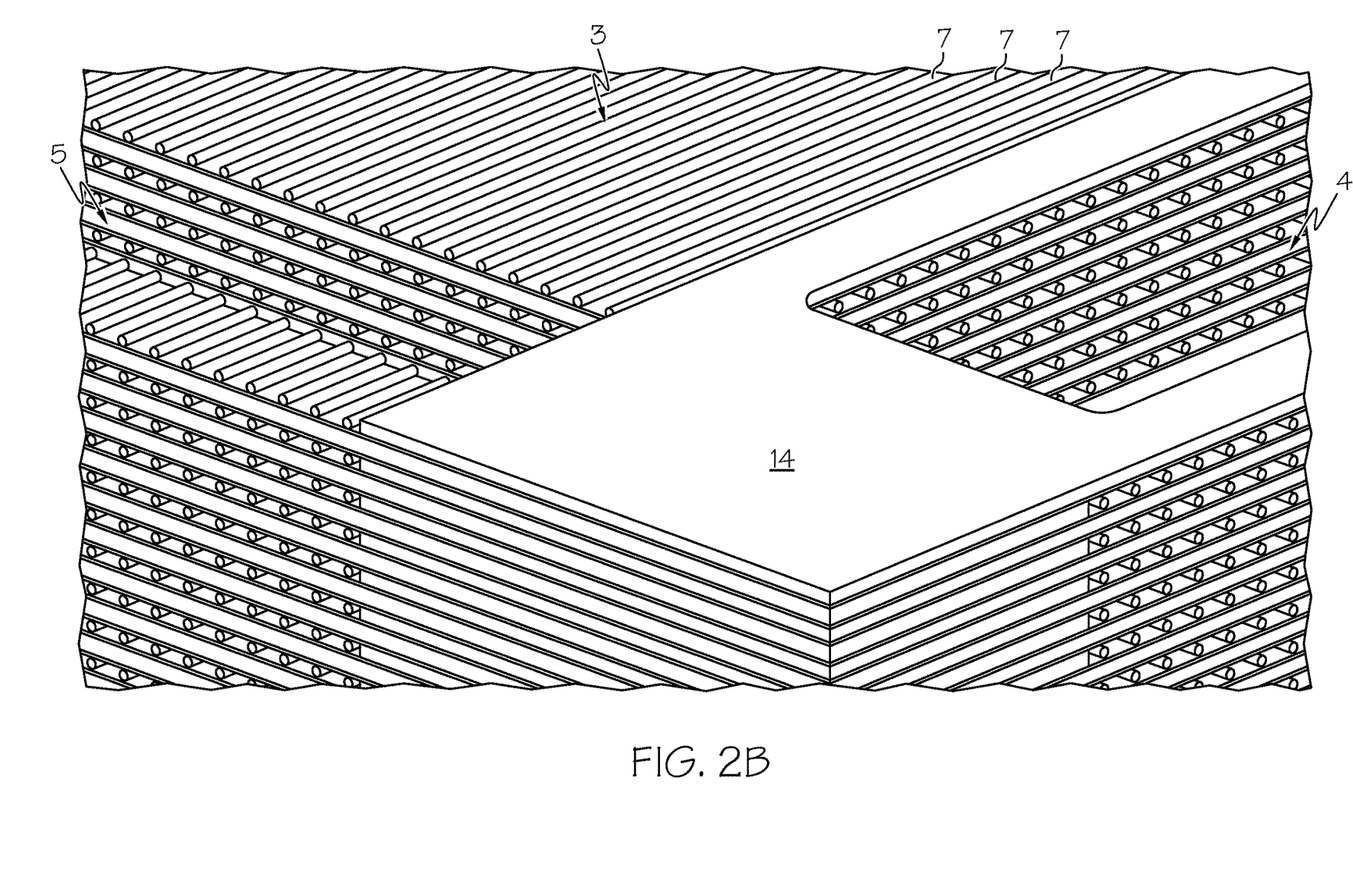
FIG. 2b is a detailed perspective view of the water vapor transfer unit of FIGS. 1a and 1b with the water vapor transfer or gas diffusion media and membrane material removed, showing the details of the wet side separator plate, including the wet flow field, dry side and wet side headers, and an edge strip.
Figure 2C:
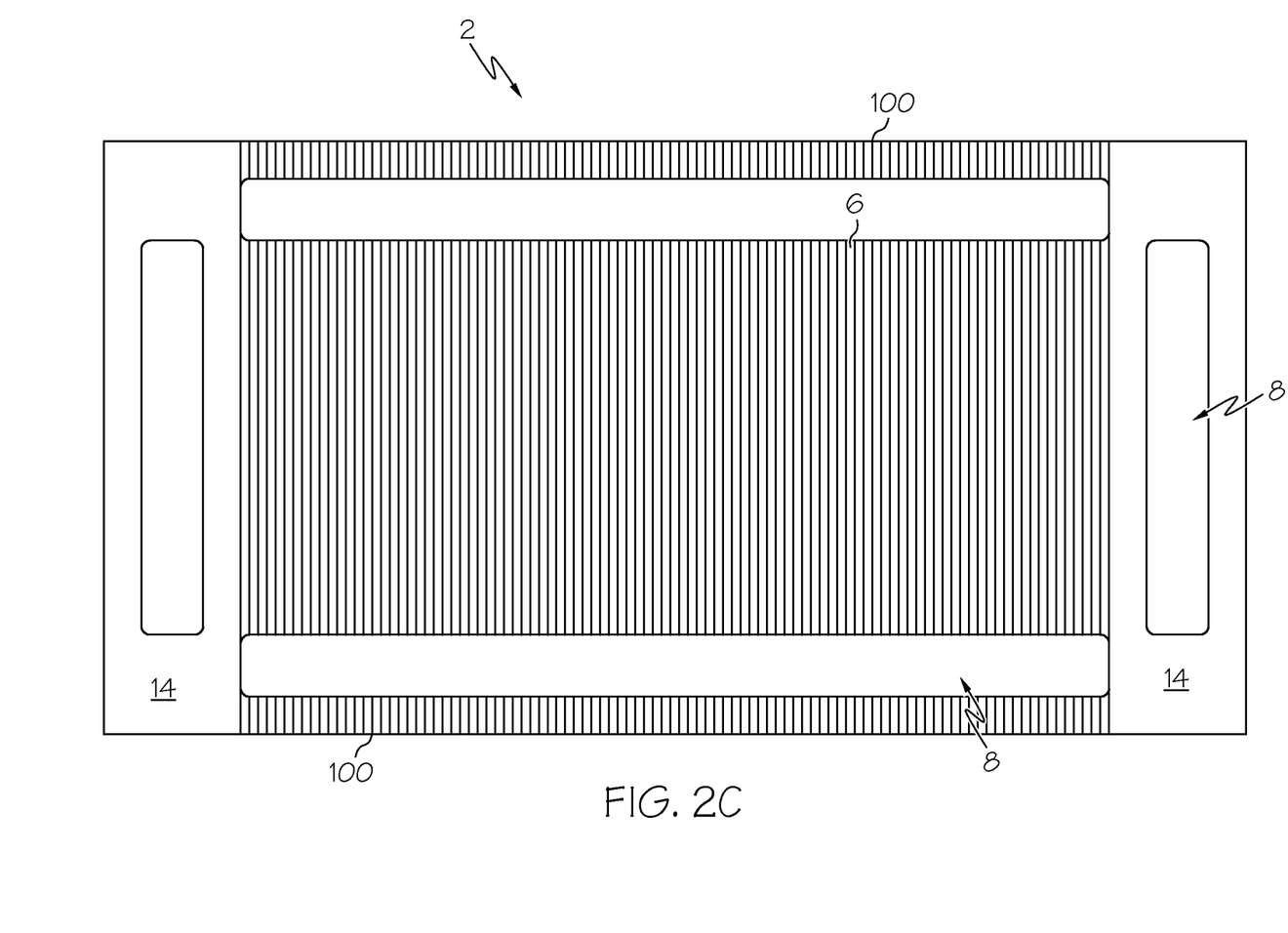
FIG. 2c is a detailed top view of a single plate in the water vapor transfer unit with the water vapor transfer or gas diffusion media and membrane material removed, showing the apertures.

As shown in FIG. 2c, two apertures 8 may be formed in the region of the dry side plates 2 defining the flow channels 6 and two may be formed in the edge strips 14. While a dry side plate 2 is depicted in FIG. 2c, it will be appreciated that a wet side plate 3 (not shown) is similarly constructed. The edge strips 14 on the dry side plates 2 block wet fluid flow from entering the dry side flow channels 6, while the edge strips 14 on the wet side plates 3 block dry fluid flow from entering the wet side flow channels 7. The edges 100 of the plates 2, 3 may be sealed with potting material to prevent fluid flow leakage through the ends of the respective flow channels 6, 7.

Figures 3, 3A:
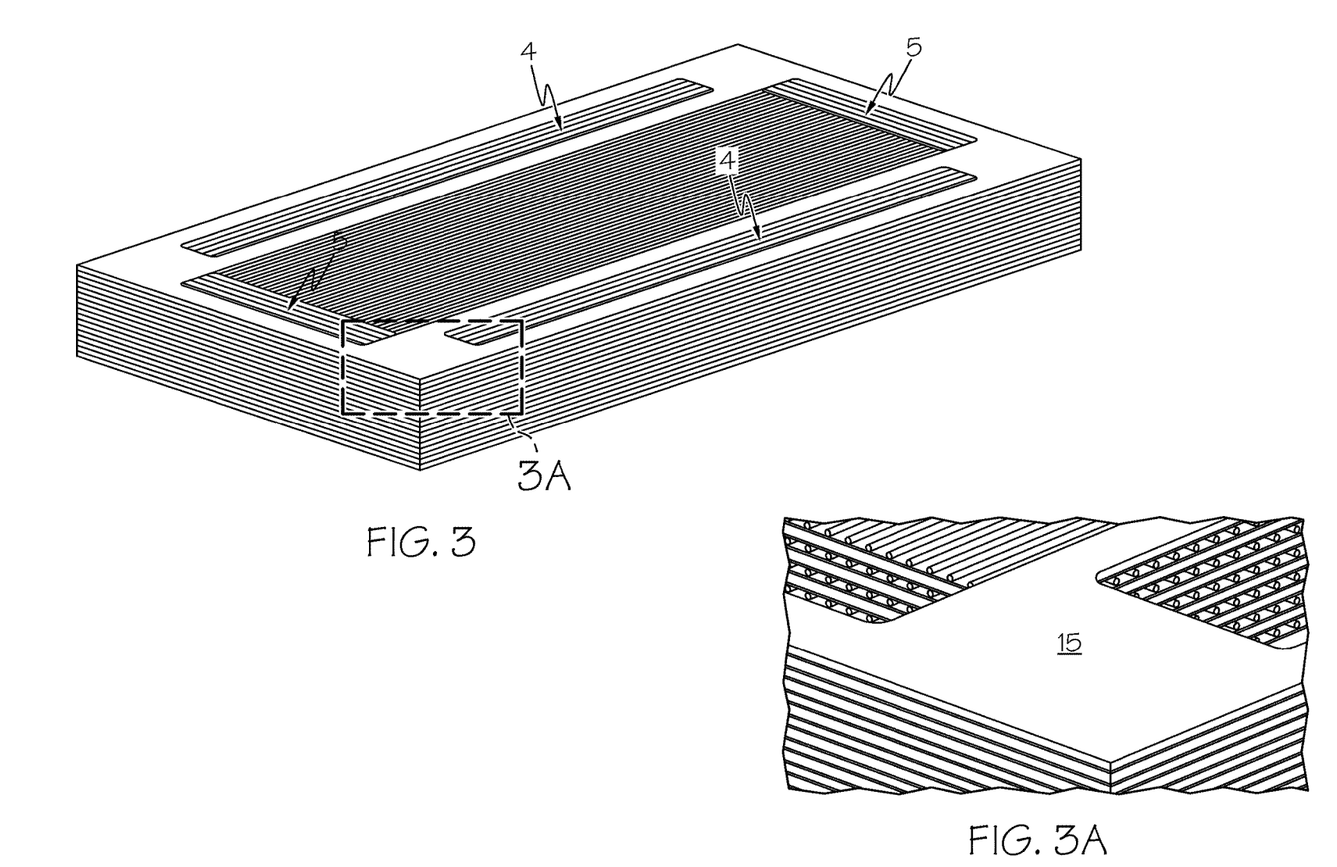
FIG. 3 is a perspective view according to one embodiment of the present disclosure showing picture frame edges sealing all four edges of a wet side plate.
FIG. 3a is a detailed view of the picture frame edges of FIG. 3.

In an alternate embodiment employing picture frame edges 15, FIG. 3, the plates 2, 3 do not require sealing around the edges using potting materials; the picture frame edge 15 seals the entire plate 2, 3 around the outside edges. In one embodiment, the edge strips 14, as shown in FIG. 2c, are subsumed into the larger structure of the picture frame edge 15. The inlet and outlet headers 4, 5 are situated so that the wet and dry fluids flow through the thickness of the stacked plates 2, 3 and through the individual flow channels 6, 7 of the respective dry side 2 and wet side 3 plates. In a cross-flow design, the flow channels 6, 7 of the dry side plates 2 and the wet side plates 3 are stacked perpendicular to each other, while in a counter-flow design, they are stacked in opposing parallel directions.

Figure 4B:
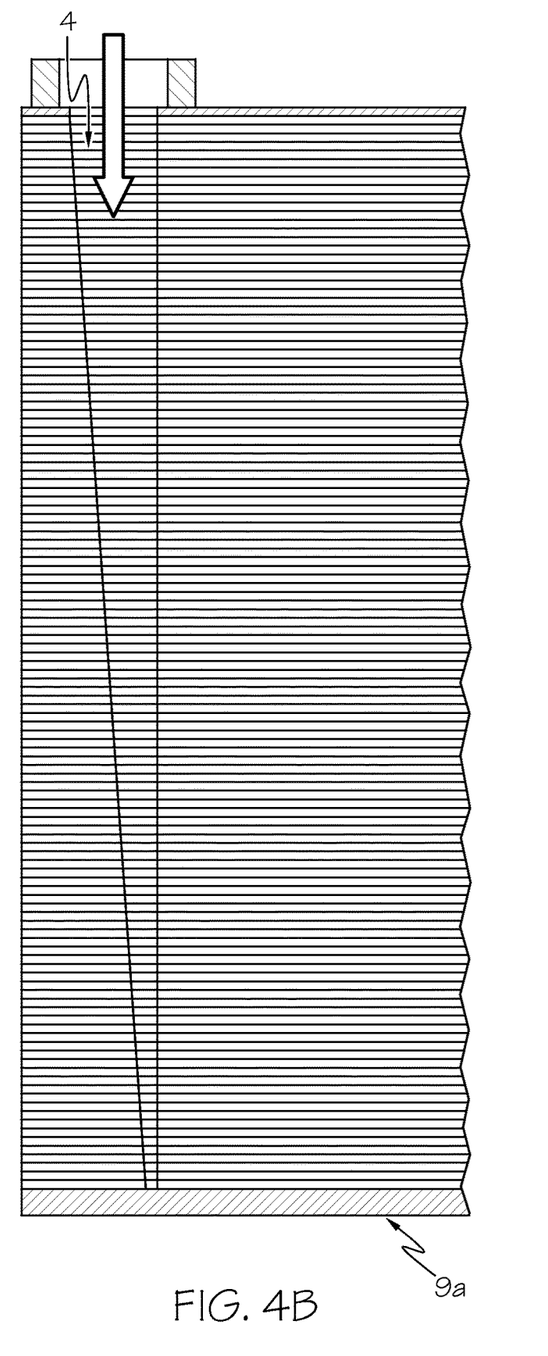

Referring next to FIGS. 4a-4b, the inlet and outlet headers 4, 5 may be formed in any shape to optimize fluid flow distribution. For example, as shown in FIG. 4a, the shape of the apertures 8 defining the headers 4, 5 in each plate is the same so that when the individual plates 2, 3 are stacked, each header 4, 5 defines a constant cross-section through the thickness of the water vapor transfer unit 1. Such an approach emphasizes simplified and low-cost manufacturing. In another form, the headers 4, 5 may be tapered as in FIG. 4b to direct more fluid flow through the upper plates 2, 3 and to increase fluid flow velocity though the lower plates 2, 3. This taper design produces a more uniform flow distribution through the flow channels 6, 7 and avoids flow maldistribution which results in decreased performance of heat exchange. The taper can be achieved efficiently by blanking the plates 2, 3 during the plate stacking process. The individual shapes required to form the taper can be achieved readily through either a laser blanking or water jet cutting process.

Figure 5:
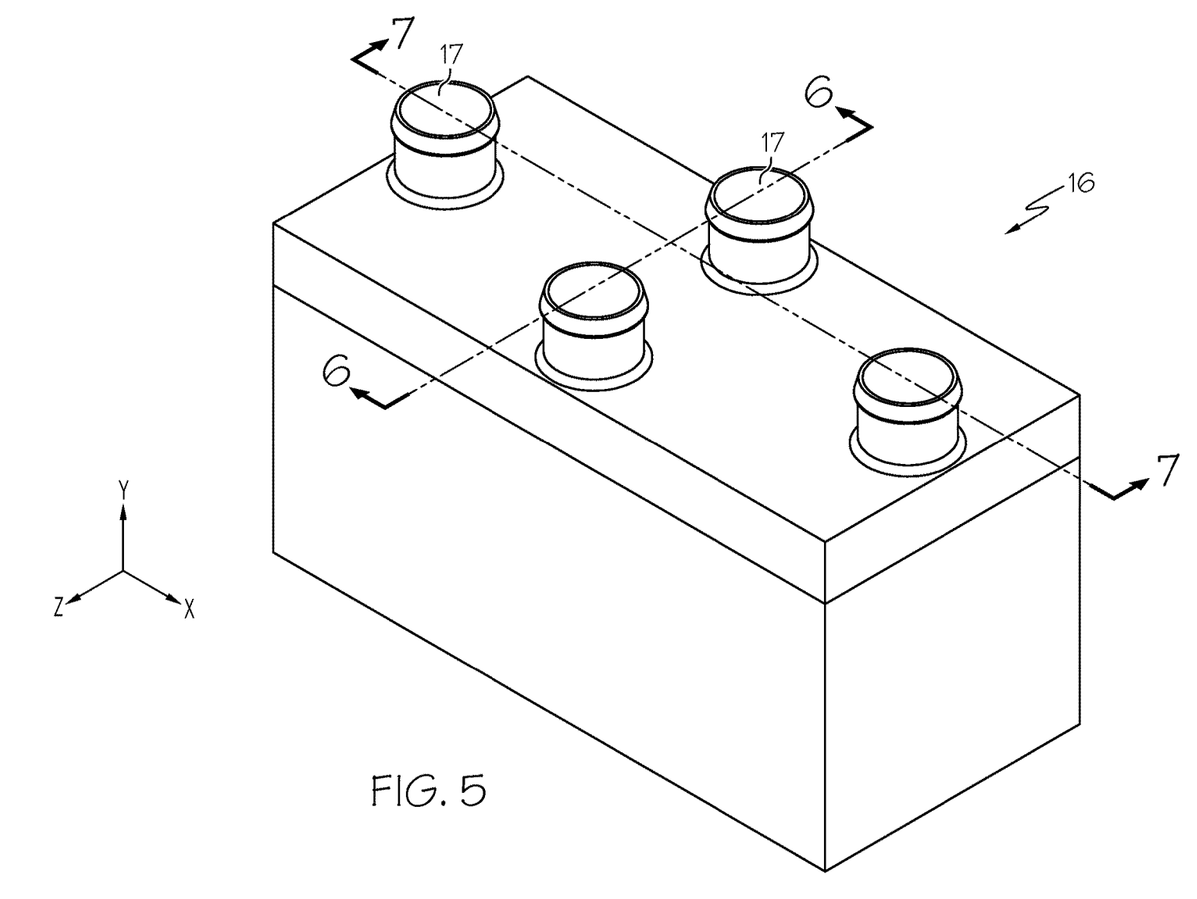
FIG. 5 is a perspective view of a water vapor transfer unit housing according to the present disclosure showing the fluid inlet and outlet manifolds disposed on a single plane of the stacked separator plates.
Figure 6:
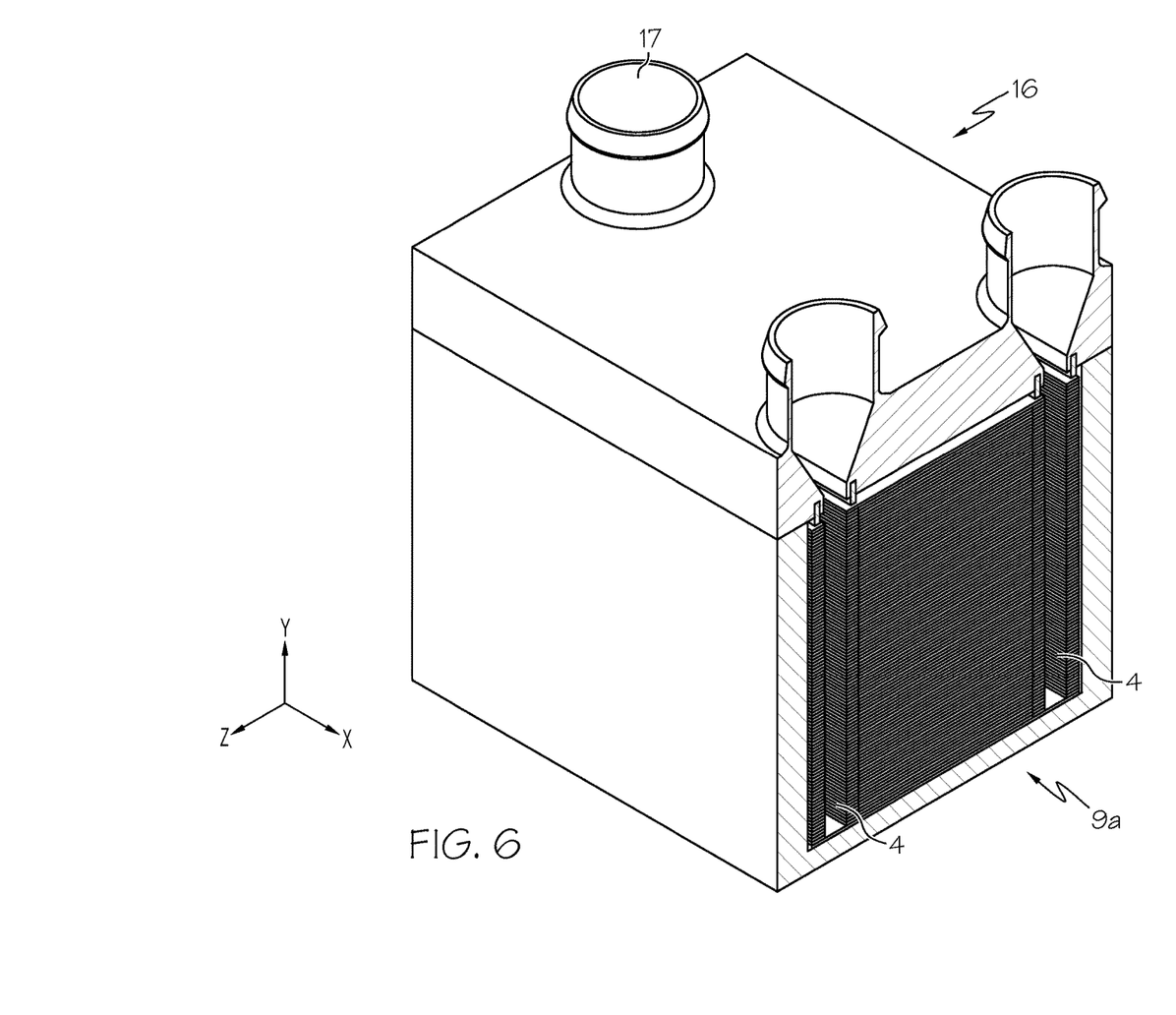
FIGS. 6 and 7 are cutaway views of the water vapor transfer unit disposed within a housing showing the fluid inlet and outlet headers disposed through the thickness of the water vapor transfer unit and fluid inlet and outlet manifolds disposed on a single plane of the stacked separator plates.
Figure 7:
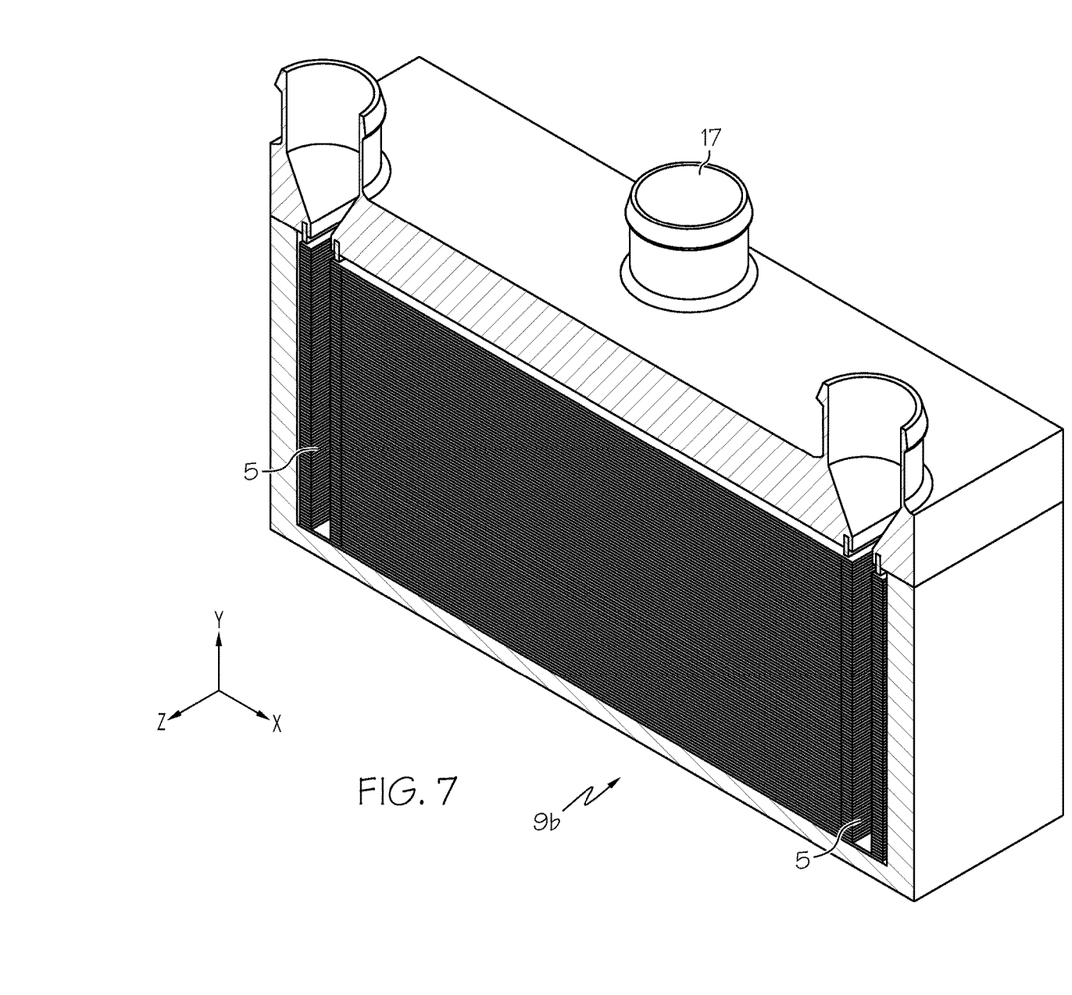

Referring next to FIGS. 5-7, a water vapor transfer unit 1 is disposed in a housing 16 having fluid inlet and outlet manifolds 17 disposed on the upper surface of the stacked plates 2, 3. FIGS. 6 and 7 show cut-away views of the plates 2, 3 stacked within the housing 16 having headers 4, 5 integrated within the thickness of the stack. The fluid inlet and outlet manifolds 17 are disposed on the top plane of the water vapor transfer unit 1 and allow fluid flow to enter the stack, flow through the integrated fluid conduits 9a, 9b and out the outlet manifolds 17. The integrated fluid conduit 9a, 9b comprises an inlet header 4, 5 and an outlet header 4, 5, and directs fluid flow through the inlet header 4, 5, across the plates 2, 3, and through the outlet header 4, 5. In FIGS. 6 and 7 all of the inlet and outlet flowpaths originate and terminate on a single plane of the stacked separator plates 2, 3 and the integrated fluid conduits 9a, 9b are sealed on that single plane defined by the stack.

While certain representative embodiments and details have been shown for purposes of illustrating the invention, it will be apparent to those skilled in the art that various changes may be made without departing from the scope of the invention, which is defined in the appended claims.

What is claimed is:

1. A water-vapor transfer unit for a fuel-cell system, the water-vapor transfer unit comprising:
    a plate-stack comprising:
        a plurality of dry-side plates and a plurality of wet-side plates being alternately stacked along a stacking dimension,
            each dry-side plate and each wet-side plate being generally planar in a planar dimension that is orthogonal to the stacking dimension,
            each dry-side plate defining a plurality of dry-side flow channels extending in a first direction along the planar dimension,
            each wet-side plate defining a plurality of wet-side flow channels extending in a second direction along the planar dimension,
            each dry-side plate being in humidity-exchange communication with at least one respective wet-side plate such that humidity can move between dry-side fluid flowing through the dry-side flow channels and wet-side fluid flowing through the wet-side flow channels,
        the plate-stack being sealed about edges of the plate-stack to prevent fluid flow from the edges of the plate-stack;
    a plurality of apertures defined through each wet-side plate and each dry-side plate in the stacking dimension, the plurality of apertures having a dry-side aperture group and a wet-side aperture group; and
    a sealing plate disposed at a top of the plate-stack, the sealing plate having a plurality of face seals extending therefrom, the plurality of face seals including a wet-side face-seal group and a dry-side face-seal group;
    a plurality of dry-side headers extending along the stacking dimension, each of the plurality of dry-side headers defined by respective ones of the dry-side aperture group;
    a plurality of wet-side headers extending along the stacking dimension, each of the plurality of wet-side headers defined by respective ones of the wet-side aperture group;
    a dry-side integrated fluid conduit for flow of the dry-side fluid therethrough, the dry-side integrated fluid conduit defined by the dry-side face-seal group, the plurality of dry-side headers, and the dry-side flow channels; and
    a wet-side integrated fluid conduit for flow of the wet-side fluid therethrough, the wet-side integrated fluid conduit defined by the wet-side face-seal group, the plurality of wet-side headers, and the wet-side flow channels,
    wherein the dry-side fluid enters the dry-side integrated fluid conduit through a first dry-side face-seal of the dry-side face-seal group, travels through a first dry-side header of the plurality of dry-side headers along the stacking dimension, is generally distributed through the plurality of dry-side flow channels from the first dry-side header, travels through a second dry-side header of the plurality of dry-side headers along the stacking dimension, and exits through a second dry-side face-seal of the dry-side face-seal group, and
    wherein the wet-side fluid enters the wet-side integrated fluid conduit through a first wet-side face-seal of the wet-side face-seal group, travels through a first wet-side header of the plurality of wet-side headers along the stacking dimension, is generally distributed through the plurality of wet-side flow channels from the first wet-side header, travels through a second wet-side header of the plurality of wet-side headers along the stacking dimension, and exits through a second wet-side face-seal of the wet-side face-seal group.

2. The water-vapor transfer unit of claim 1, wherein the dry-side flow channels are disposed generally perpendicular to the wet-side flow channels.

3. The water-vapor transfer unit of claim 1, wherein:
    each dry-side plate includes a first edge portion and a second edge portion, the first edge portion and the second edge portion being substantially parallel to the dry-side flow channels, the plurality of dry-side flow channels being disposed between the first edge portion and the second edge portion;
    each wet-side plate includes a third edge portion and a fourth edge portion, the third edge portion and the fourth edge portion being substantially parallel to the wet-side flow channels, the plurality of wet-side flow channels being disposed between the third edge portion and the fourth edge portion;
    the dry-side aperture group is disposed within the third edge portion and the fourth edge portion of the wet-side plates; and
    the wet-side aperture group is disposed within the first edge portion and the second edge portion of the dry-side plates.

4. The water-vapor transfer unit of claim 3, wherein the first edge portions, the second edge portions, the third edge portions, and the fourth edge portions are disposed within a picture-frame edge.

5. The water-vapor transfer unit of claim 1, wherein the plurality of apertures of the dry-side aperture group are disposed within the plurality of dry-side flow channels and extend orthogonally thereto, and wherein the plurality of apertures of the wet-side aperture group are disposed within the plurality of wet-side flow channels and extend orthogonally thereto.

6. The water-vapor transfer unit of claim 1, wherein each of the plurality of dry-side headers and each of the plurality of wet-side headers define a tapered shape along the stacking dimension.

7. The water-vapor transfer unit of claim 1, further comprising a housing defining a cavity, the plate-stack being disposed within the cavity, the plurality of face seals configured to engage the housing and provide a space between the plate-stack and the housing, wherein the plurality of face seals allow expansion and contraction of the plate-stack within the housing by deflecting during a temperature change of the plate-stack while maintaining a substantially fluid-tight connection.

8. The water-vapor transfer unit of claim 1, further comprising a housing having a plurality of dry-side fluid manifolds and a plurality of wet-side fluid manifolds disposed thereon, the plurality of dry-side fluid manifolds corresponding to the dry-side integrated fluid conduit and the plurality of wet-side fluid manifolds corresponding to the wet-side integrated fluid conduit.

* * * * *